(No Model.)　　　　　　　　　　　　　　　　　5 Sheets—Sheet 1.
J. P. COLEMAN.
ELECTRICAL SIGNALING APPARATUS.
No. 404,170.　　　　　　　　　　Patented May 28, 1889.
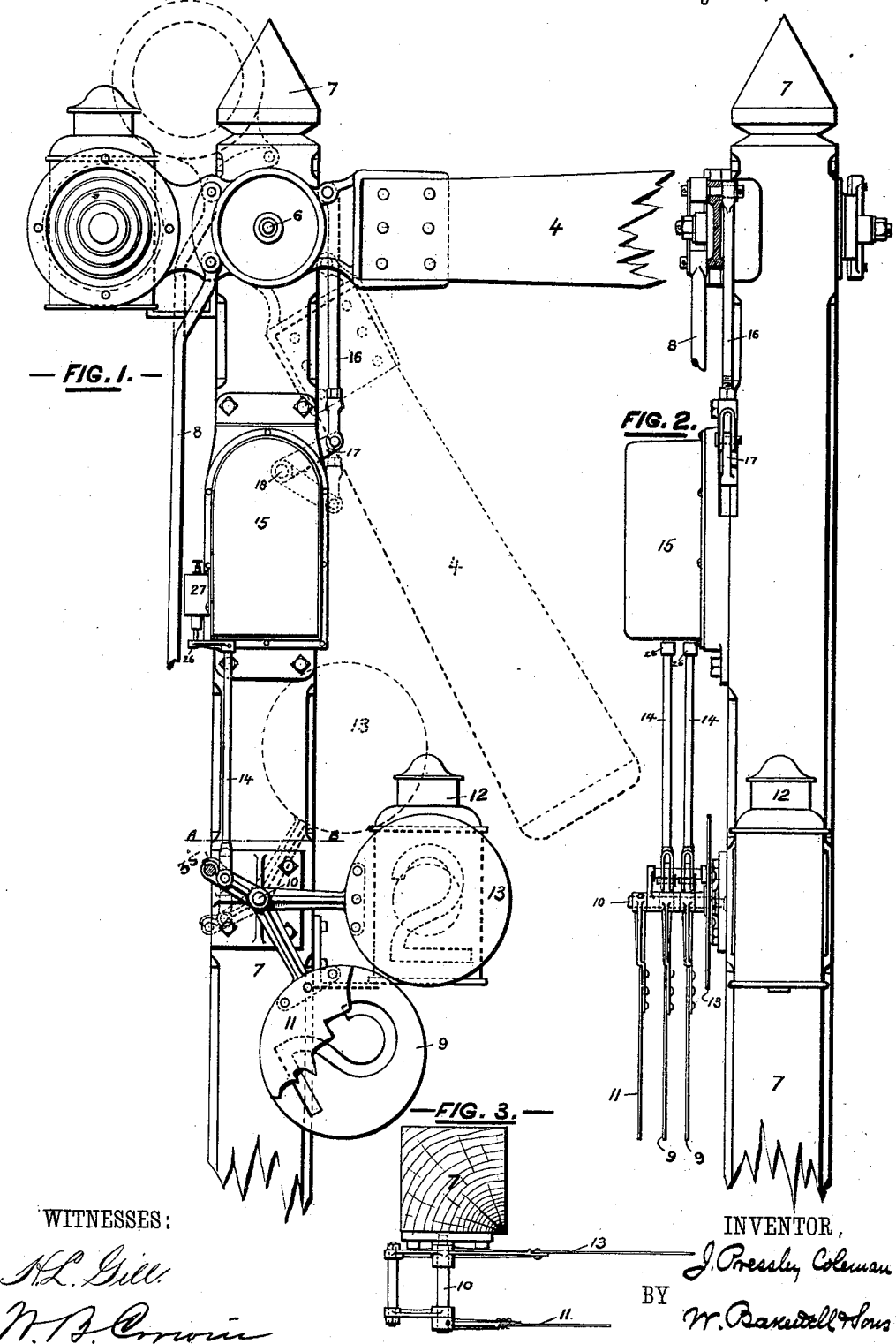
WITNESSES:　　　　　　　　　　　　　　　　INVENTOR,
　　　　　　　　　　　　　　　　　　　　　J. Pressley Coleman
　　　　　　　　　　　　　　　　　　　BY
　　　　　　　　　　　　　　　　　　　　W. Bakewell & Sons
　　　　　　　　　　　　　　　　　　　　　　ATTORNEYS (No Model.) 5 Sheets—Sheet 2.
J. P. COLEMAN.
ELECTRICAL SIGNALING APPARATUS.
No. 404,170. Patented May 28, 1889.
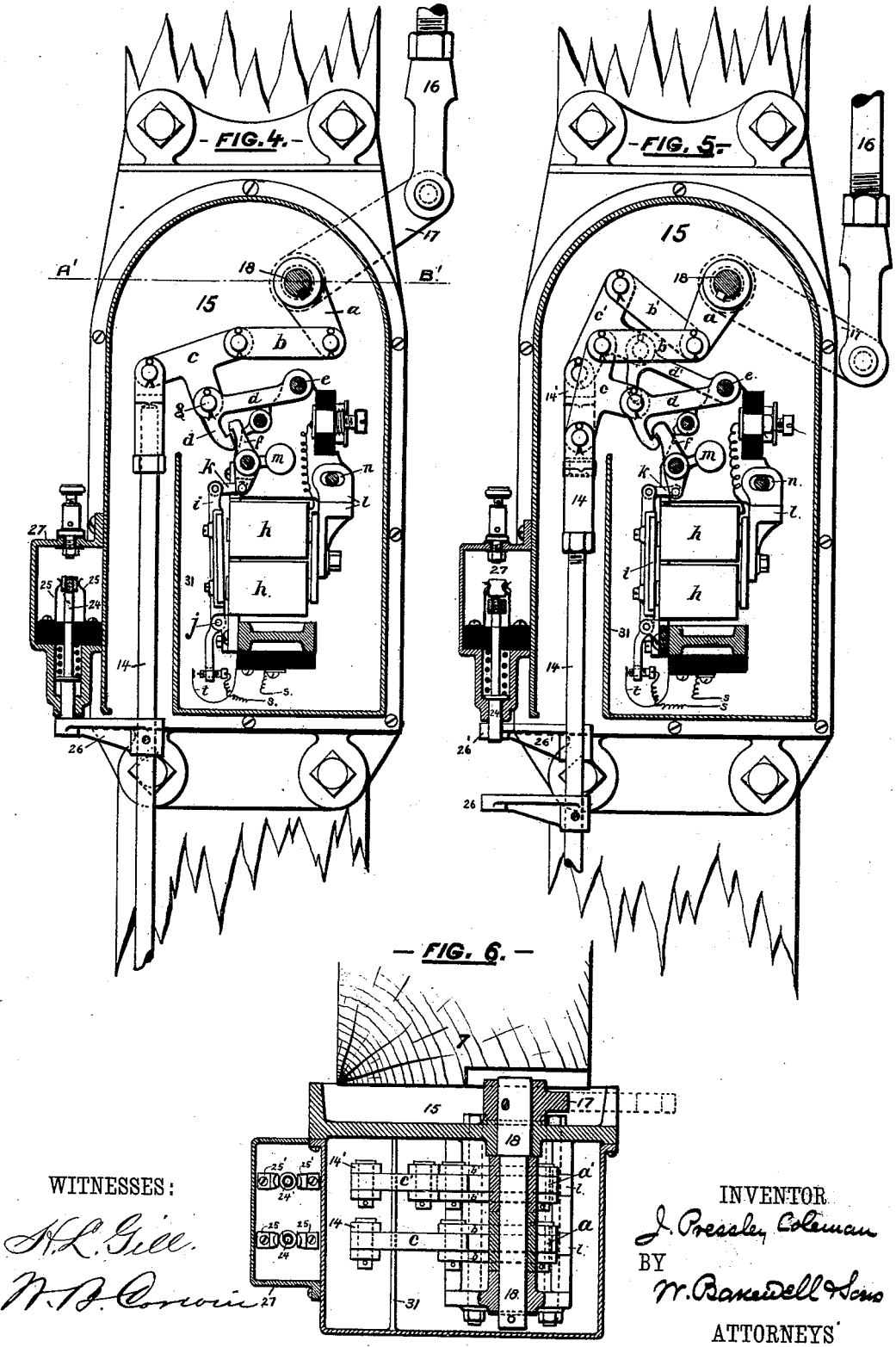
WITNESSES:
H. L. Gill.
W. B. Corwin.
INVENTOR
J. Pressley Coleman
BY
W. Bakewell & Sons
ATTORNEYS

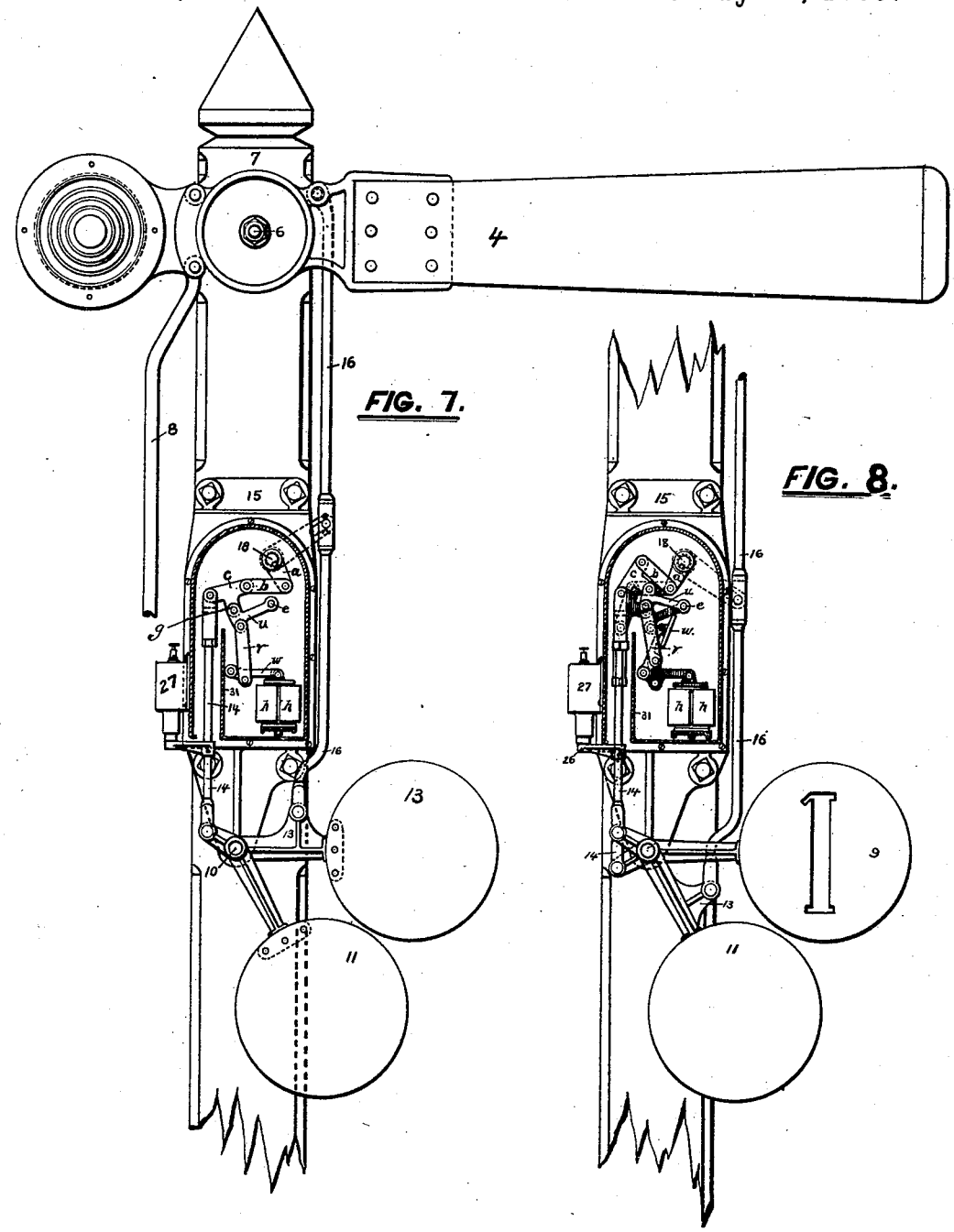

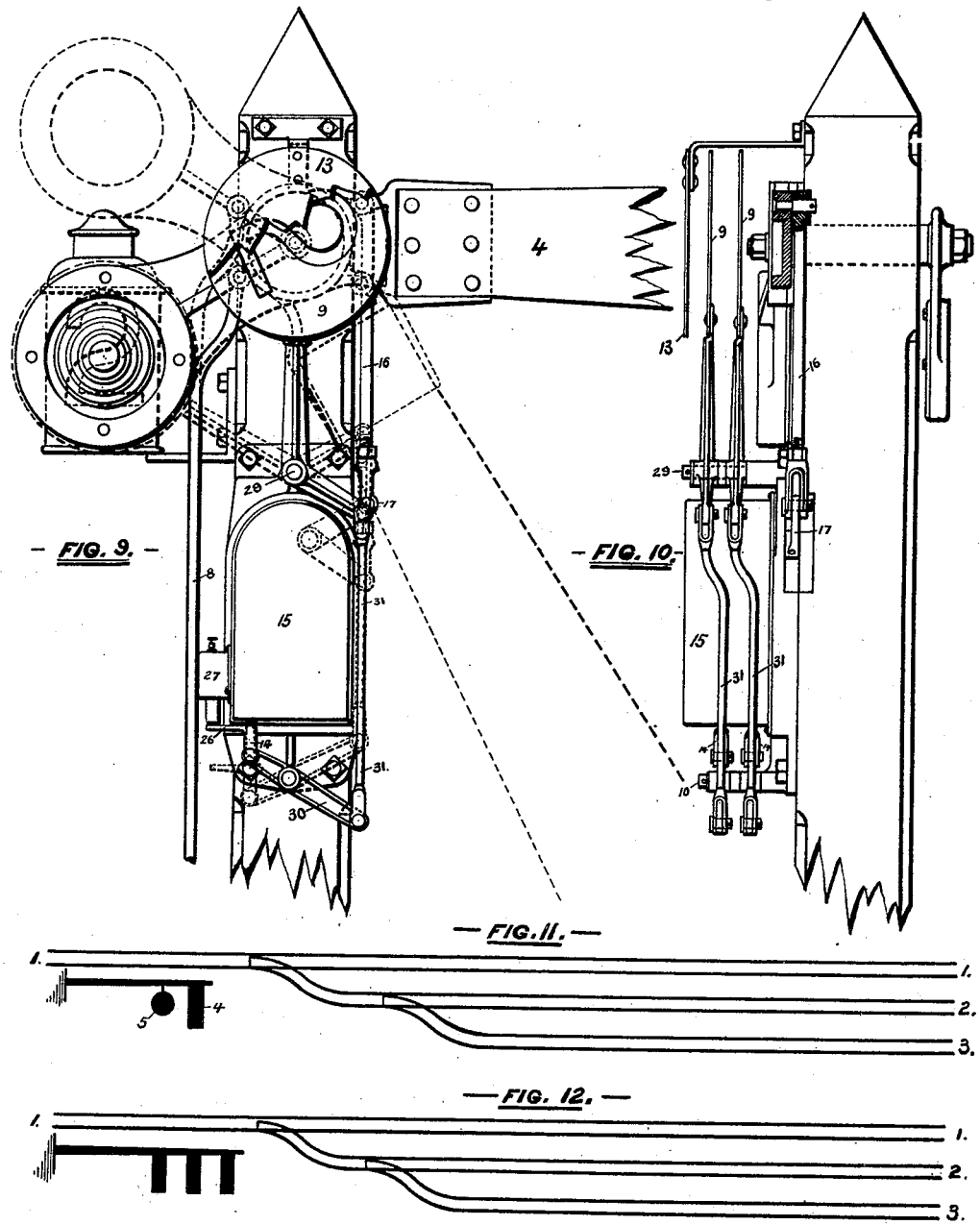

(No Model.) 5 Sheets—Sheet 5.

J. P. COLEMAN.
ELECTRICAL SIGNALING APPARATUS.

No. 404,170. Patented May 28, 1889.

WITNESSES:
N. L. Gill.
N. J. Corwin.

INVENTOR,
J. Pressley Coleman
BY
W. Bakewell & Sons
ATTORNEYS.

UNITED STATES PATENT OFFICE.

JOHN PRESSLEY COLEMAN, OF SWISSVALE, PENNSYLVANIA.

ELECTRICAL SIGNALING APPARATUS.

SPECIFICATION forming part of Letters Patent No. 404,170, dated May 28, 1889.

Application filed April 2, 1888. Renewed May 4, 1889. Serial No. 309,670. (No model.)

*To all whom it may concern:*

Be it known that I, JOHN PRESSLEY COLEMAN, of Swissvale, in the county of Allegheny and State of Pennsylvania, have invented a new and useful Improvement in Electrical Signaling Apparatus; and I do hereby declare the following to be a full, clear, and exact description thereof, reference being had to the accompanying drawings, forming part of this specification, in which—

Figure 13:
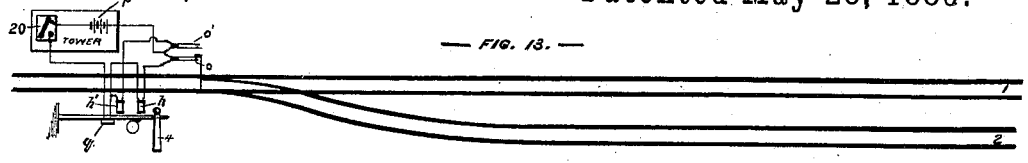
Figure 14:
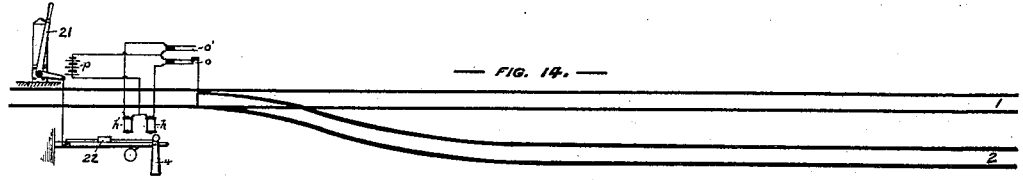
Figure 15:
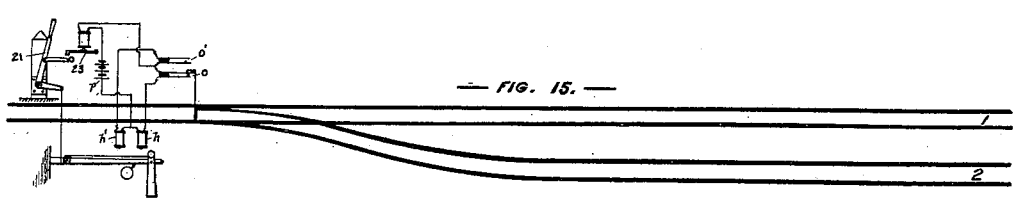
Figure 16:
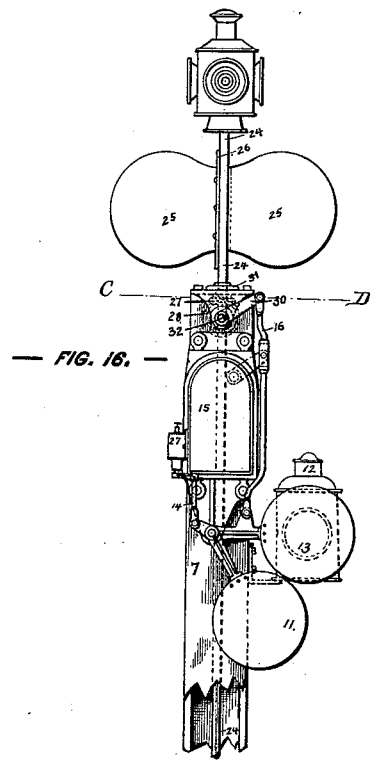
Figure 17:
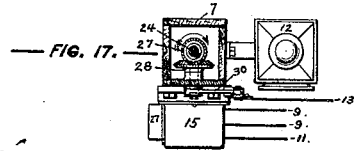

Figure 1 is a front view of my improved signaling apparatus. Fig. 2 is a side view thereof. Fig. 3 is a horizontal cross-section on the line A B of Fig. 1. Fig. 4 is a vertical central section of the box, showing the construction and arrangement of the electrical appliances by which the secondary signals are connected with and disconnected from the primary signal. This figure shows all the parts in the position which they occupy when the primary signal is at "danger." Fig. 5 is a similar view, in which the connecting parts in the foreground, by which one of the secondary is connected with the primary signal, are shown in the position which they occupy when the connection is made by the electro-magnet, in which case movement of the primary signal from "safety" to "danger" will also move one of the secondary signals, while the parts in the rear, which belong to another secondary signal, are shown in the position which they occupy when the connection is broken, in which case movement of the primary signal has no effect on the secondary signal. Fig. 6 is a vertical cross-section on the line A' B' of Fig. 4, showing the operative parts of the two secondary signals in plan view. Fig. 7 is a front elevation of a modified form of the apparatus. Fig. 8 is a similar view showing the parts in the position which they occupy when one of the secondary signals is displayed. Fig. 9 is a front view of a signaling apparatus constructed according to my invention, wherein a single lamp is used both for the primary and secondary signal. Fig. 10 is a side view thereof. Fig. 11 is a diagram view illustrating the signaling system to which my improvement is applied. Fig. 12 is a similar view showing the other mode of signaling, wherein a separate primary signal is employed for each track and no secondary signals are employed. Figs. 13, 14, and 15 are diagram views showing the modes of controlling the operation of the secondary signals automatically by operation of the switches of the railroad-track, and also illustrating circuits controlling the different apparatus for operating the signal. Fig. 16 is a front view of my improvement applied to a rotary form of signal much used on railroads at present; and while preferring to use my device in connection with semaphore-signals, I still wish to show that, if desired, it is applicable to other forms as well. Fig. 17 is a horizontal section on the line C D of Fig. 16, and shows the means of transferring the rotary motion of the main vertical signal-shaft to the horizontal spindle 18 of the selector by means of two beveled gears keyed to the respective shafts.

Like symbols of reference indicate like parts in each.

My invention relates to an improvement in that class of railway-signals for controlling a main line of track and a number of branch lines in which there is a single primary signal mounted on the usual post, which serves to indicate either that the track is clear and that an approaching train may pass or that the track is not clear and that the train must stop, while on the same post are a number of secondary signals or route-signals which serve to indicate to which of a number of branching tracks or switches the primary signal has reference. This system of signals is one of very great utility, because the signals occupy very much less room on the posts, economize in lamps, and are easier to read than if there were a separate primary signal referring to each track. In large railway-yards where there are many tracks these features are of material importance.

In Fig. 12 I show a diagram view of a signal-post provided with a separate primary signal or semaphore for each of three connecting-tracks, 1, 2, and 3. When all of these signals are in the horizontal "danger" position, they indicate that none of the tracks is clear, and when one of the signals is brought to a downwardly-inclined position it shows that an approaching train is free to enter that one of the tracks which is designated by the position of the signal which is moved. These signal-arms are designed to indicate the position of the railway-switches, and it is obvious that where there are a great number of connecting-tracks the arrangement of so many large signals on a post is inconvenient and often impracticable, as well as confusing, on account of the large number of lights displayed. The other system of signals to which I have referred is shown in Fig. 11, which is a diagram view of the railway-tracks and signal-posts, 4 being the primary signal, which consists of a pivoted semaphore-arm of the usual form, while 5 represents the secondary signals, which consist of a number of pivoted disks numbered to indicate the several tracks 1, 2, and 3 and pivotally mounted side by side behind a cover or screen. When the primary signal is in its "danger" position, as shown in Fig. 10, all the route-signals are covered by the screen; but when the primary signal is depressed to indicate "safety," its operating mechanism acts on one of the route-signals and moves it away from its position behind the screen, so as to display it and to indicate the track which by movement of the switch has been placed in position to receive the train. The proper route-signal which is thus moved is determined by a selector, which is an apparatus by which any one of the several route-signals is connected with the operative mechanism of the primary signal, so as to be moved thereby, while the other route-signals are disconnected therefrom, so that they are not moved. The controlling mechanism of the selector is the switch-lever of the railway-track, or, preferably, the switch-rails themselves, and when the signal or lever is moved to allow the train to pass on track No. 1 the selector is affected thereby to cause the route-signal No. 1 to be connected with the primary signal, so that when the primary signal is moved to "safety" the route-signal No. 1 shall be moved simultaneously therewith away from the cover or screen by which it was obscured. In like manner, when the switch-lever is moved so as to open track No. 2 or No. 3, it will affect the selector, so as to put the corresponding route-signal, No. 2 or No. 3, into gear with the primary signal mechanism and to disconnect the other signals. This is a general description of the system.

My invention consists in three items—viz., in the construction of the selector itself, the controlling of the selector electrically instead of mechanically, and the operation of the route-signals directly from the primary signal. Heretofore these route-signals have only been controlled by a direct mechanical connection from the switches, the selector being a mechanically-operated apparatus, which is interposed in the line of the route-signal mechanism, and which is controlled by the action of the switch-lever and operated by a separate lever interlocked in the switch-levers.

By the differences in arrangement and construction which I have mentioned I not only simplify the apparatus, but cause it to operate with greater certainty and safety.

Referring now to figures on Sheets 1 and 2 of the drawings, 4 is the arm of the primary signal or semaphore, which is of any suitable form and arrangement. That which I have shown in the several drawings is the form which is in very common use on railroads in this country. It is pivoted at 6 to an upright post, 7, and at its short end is weighted, so that when unrestrained the weight shall tend to raise the arm into a horizontal position, indicating "danger." The semaphore is moved into the downwardly-inclined position shown by dotted lines on Fig. 1, and indicating "safety," by means of a lever in the usual signal-tower, which is connected with the semaphore by any suitable means to operate it thereby, part of which is the connecting-rod 8. This mechanism is well understood by those skilled in the art, and as it does not form part of my present invention it is not necessary to describe it otherwise than to say that when the parts are moved by the operator so as to raise the rod 8 it tilts the semaphore into an inclined "safety" position, indicating that the track is clear and that the approaching train may proceed, and when the operative mechanism is reversed, or when in any way its connection with the semaphore is disjoined, the gravity of the weighted end will raise the semaphore to the horizontal "danger" position. Below the semaphore on the post 7 is the secondary signal apparatus. It consists of a number of disks, 9, mounted on arms which are pivoted to a shaft, 10, on which the arms and the disk are moved radially. When in their lowest position, these disks 9 rest behind a cover or screen, 11, which is keyed to the shaft 10 and is immovable, which screen obscures the disks from view, and when either of them is raised it is removed from behind the screen and is brought into a position in front of a lantern, 12, and at the same time a screen, 13, which normally obscures the lantern, is raised from before it into the position shown by dotted lines in Fig. 1. There are the proper number of the disks 9, corresponding to the number of the branching tracks, and these disks are numbered so as to indicate these tracks, the numbers being transparent, so that at night they may be discerned by the light of the lantern shining through them from the back.

In the drawings I have shown two of the disks, the post being arranged for use at a point where a single side track branches off from the main line of the railroad-track. In this arrangement when disk No. 1 is exposed it indicates that the main track is clear, and when disk No. 2 is exposed it indicates the side track is clear. These disks are moved into the positions I have indicated by means of upright rods 14, which are connected to the rear ends of the pivoted arms of the disk and extend up into the selector box or case 15, as shown in Figs. 4, 5, and 6.

16 is a vertical rod which is connected with the semaphore 4 and extends down to the level of the box 15, where it is connected with a lever, 17, the extremity of which is connected or keyed to a shaft, 18, which is journaled within the box 15.

Each of the rods 14 is connected with the shaft 18 by a separate connecting mechanism. I shall describe one of these mechanisms, the others being identical in construction and arrangement. A short lever-arm, $a$, is keyed to the shaft 18, and at its ends is pivotally connected with short links $b$, one on each side, the other ends of which links are pivotally connected with a three-armed crank, $c$. The end of one of the arms of the crank $c$ is connected with the rod 14, the end of the second arm is connected with the end of the links $b$, and the third arm is connected by a pin, $g$, with a hooked arm, $d$, the end of which is pivoted on a stationary pivot, $e$, while the hooked end projects into the path of a pivoted rocking hook, $f$, so that it may be engaged thereby, as shown in Fig. 5. When the hooks $d$ and $f$ are thus engaged, it is clear that if the rod 16 be moved down the mechanical action of the levers and connecting-links is to rock the crank $c$ on the pivot $g$ as a center, and thus to depress the rod 14 and to raise the signal-disk 9, which is connected therewith. If, on the other hand, the hooks $d$ and $f$ be disengaged, the downward motion of the rod 16 will not have this effect; but the part $c$, being unrestrained by the hooks, will swing up on the center of its pivotal connection with the rod 14, thus taking up or absorbing the motion.

Each of the rods 14 is connected with the shaft 18 by a separate combination of mechanism such as I have just described, and it is clear that when the rod 16 is moved down one of the rods 14 whose hooks $d$ and $f$ are engaged will be moved down so as to elevate the route-signal disk 9, to which it is connected, while those rods whose hooks $d$ and $f$ are not so connected are not affected at all by the movement of the rod 16. Thus in Fig. 5 the mechanism in the front of the box is shown with the hooks in engagement, and the rod 16 having moved down, its route-signal rod 14 is moved thereby, and in the mechanism in the rear of the box (designated by the same reference-letters and distinguished by the prime mark) the hooks are not in engagement, and the route-signal pertaining to this mechanism is not moved. These hooks are controlled so as to engage each other or to be disengaged by means of a pair of electro-magnets, $h$, there being one set of magnets for each of the rods 14 and its operative mechanism.

The armature-bar $i$ of each magnet is pivoted at $j$ and at its other end is connected by a link, $k$, with the pivoted hook-arm $f$, so that when the circuit of the electro-magnet is closed and the armature is attracted to the magnets the hook $f$ shall be moved forward thereby into engagement with the other hook, $d$, and when the circuit is broken the armature shall be pushed back and the hooks disengaged by the action of a weight, $m$. If, after the current has been broken, there should be any residual magnetism in the magnets tending to hold the armature $i'$, the armature will be unseated by the next shifting of the semaphore to the "danger" position by reason of the downward motion of the hook $d$, which engages the hook $f$ and shifts it so as to move the armature out of contact. The normal position of the parts is shown in Fig. 4, the armature being held away from its seat by the hook $d$, and being prevented from coming into actual contact with the magnets until the hook $d$ begins to rise. The magnets $h$ and their armature are adjusted in proper relation to each other by means of a slot, $n$, in the standard by which the magnets are supported. The magnets are shielded from the weather by means of an upright screen or shield, 31, as shown in Figs. 4 and 5.

In the circuit of each pair of electro-magnets is a circuit-closer, which is operated directly or indirectly by the action of the switch of the railway-track. This is illustrated by the diagram Fig. 13, in which $h$ and $h'$ represent two sets of magnets contained in the selector-case. In the circuit of the magnet $h'$ is the battery $p$ in the signal-tower, the electrically-operated valve $q$ of a pneumatic cylinder, which operates the semaphore-signal 4, and a circuit-closer, $o$, which is controlled by movement of the switch, being closed when the switch is in proper position to allow the train to enter the track 2 and open at other times. The pneumatic cylinder is of the kind which was patented to George Westinghouse, Jr., by Letters Patent No. 358,521. The other magnets, $h$, are likewise in circuit with the battery $p$, cylinder-valve $q$, and a circuit-closer, $o$, which is closed to complete the circuit when the switch is in position to cause the trains to pass on the track No. 1.

The operation is as follows: Suppose the tracks to be in the position last mentioned. Now if the operator in the signal-tower wishes to set the primary signal to "safety" he moves his electric switch 20, so as to complete the electric circuit. This opens the valve $q$, to admit compressed air into the pneumatic cylinder, and its piston elevates the rod 8, so as to tilt the semaphore down into an inclined "safety" position. The rod 16 of the semaphore accordingly turns the shaft 18, and the magnets $h'$ being in circuit, and the hooks $f'$ and $d'$ being in engagement, the rod 14 of the route-signal disk No. 1 is moved so as to elevate and to display that disk, the rod 14 of the other disk being unmoved. So if the railroad-switch is set to cause the train to pass on track No. 2 the same operation of the primary signal 4 will display that signal-disk No. 2. In either case the downward motion of the rod 14, which operates the route-signals, causes a hook, 35, at the rear end of the arm 10 of the route-signal to engage the rear end of the lever of the lamp-screen 13, so as to lift this screen and to display the light of the lantern 12 through the route-signal, which at the same motion is brought in front of the light. When the primary signal 4 is moved back to "danger," the route-disk 9 will be forced back behind the screen 11 and the lamp-screen 13 will drop down in front of the light.

In Fig. 14 I show another arrangement of the circuit, differing only from that of Fig. 13 in that the signal-tower is not included in the circuit, and instead of the pneumatic valve the circuit includes an "electrical slot," such as shown in my application, Serial No. 266,805, filed March 10, 1888, by which the mechanical connection of the primary signal or semaphore with a lever, 21, in the signal-tower is made or broken. When the railway-switch is set for either track 1 or 2, the circuit is complete, and the lever 21 can be moved to bring the primary signal to "safety;" but if the switch is not properly set, so that neither track is in condition to receive a train, the circuit is broken, and the electrical slot therefore breaks the mechanical connection between the lever 21 and the semaphore.

In Fig. 15 the arrangement is the same, except that instead of the slot there is a locking-lever, 23, formed by an armature of a magnet, which acts directly on the lever 21 to lock it whenever the circuit is broken.

I have shown these various circuits for the purpose of indicating that my invention is not to be restricted particularly to any of them, since the circuits may be arranged in a great variety of ways.

In Figs. 4, 5, and 6 I show, in connection with each of the rods 14, a circuit-closer, 27, of ordinary form, the spring-actuated rod 24 of which is connected with and moved by the motion of the rod 14 through a bracket, 26, to close the circuit between the contacts 25 when the rod is in its normal elevated position and to break the circuit when the rod drops. These circuits may be connected with a suitable indicator at a distant point, or may be made to operate the lock of a lever of a conflicting signal, or it may be otherwise utilized. I also show in these drawings an electrical circuit, s, connected with a circuit-closer, t, which is operated by motion of the lower arm of the armature. This circuit may also be used to control an indicator at a distant point, which shows when the armature is acting properly, or it may be used to effect locking between conflicting signals in many ways already existing in other forms of signals.

I will now describe the modified form of selector shown in Figs. 7 and 8.

The apparatus is the same as that of Figs. 1 and 2, except the interior mechanism of the selector-box and the operation of the lantern-shield 13. Each of the rods 14 has a series of links and levers connecting it with the shaft 18—viz., a lever, $a$, link $b$, and crank $c$. The middle arm of the crank $c$ is pivotally connected with a second crank, $u$, pivoted to the box at $e$, and the crank $u$ is also connected by a link, $v$, to the pivoted armature $w$ of the magnets $h$. Now, so long as the armature is held by the magnets, as shown in Fig. 7, any downward motion of the rod 16 will cause the crank $c$ to turn on the fulcrum $g$ and to move its proper route-signal. When, however, the circuit of the magnets is broken, the armature being released, there is nothing to hold the fulcrum $g$, which will shift, and all the motion of the lever $a$ will be absorbed and not transmitted to the rod 14. I show this in Fig. 8, where two of the selector mechanisms are shown, one of which (indicated by dark shading and dotted lines) is held by the armature, so that the descent of the rod 16 exposes the route-signal No. 1, while the other set of parts belonging to the route-signal No. 2, being unrestrained by any electrical circuit in the magnets, swings loosely and transmits no motion to the signal.

In Figs. 7 and 8 I show the lamp-shield 13 connected directly with the semaphore by an extension of the rod 16, so that on the descent of the semaphore into the "safety" position the shield will be depressed, and on the rise of the semaphore the shield will be drawn up also with a positively-acting force. In the other form of my invention the screen is operated by motion of any of the route-signals, thus making it impossible to uncover the lantern without placing before it an indicator, which is the result with the device of Fig. 7, should the controlling-magnet fail to perform its functions. While this device is the safest in the respect referred to, it has the disadvantage of relying on gravity to return it to its normal position, a failure of which would result in a white ("safety") light being exposed while this signal is at "danger." The other form would result in a white light with the signal at "safety," which could do no material harm.

I have shown these forms of selector mechanism and of the connection with the lamp-screen; but obviously other equivalent forms of mechanism and modes of arrangement may be employed, and, if desired, parts of the arrangement which I show in Figs. 1 and 2 may be used with parts from the apparatus of Figs. 6 and 7. For example, the shield 13 of Fig. 1 may be connected directly with the semaphore instead of being operated through the route-signal mechanism.

I have shown two forms of construction of the parts of the selector by which the secondary signals are connected with the primary signal, for the purpose of indicating that my invention is not limited precisely to any single form thereof, since in analogous devices a considerable number of equivalent forms of mechanism have been devised, of which the two shown by me are illustrations. They all have in common, however, the feature of locking the moving mechanism of the signal with the signal, so as to bring them into operative relation, and I shall therefore designate them generically by the term "lock."

The form of the invention which I show in Figs. 9 and 10 shows its adaptation to those signals wherein the secondary or route signals are illumined by the lantern of the semaphore, as described in the patent to Spicer and Schreuder, No. 372,578. The purpose of this arrangement is to economize in the number of lights employed. Here the route-signal arms are pivoted on a shaft, 29, and are movable thereon down into a position in front of the semaphore-lamp, or up into a concealed position behind the shield 13. The rods 14 of the selector-box are connected at the bottom by rocking levers 30 and vertical rods 31 with the lever-arms of the route-signals. When thus arranged, the depression of the primary or semaphore signal into "safety" will elevate one of the rods 31 to display the proper route-signal.

Referring to Figs. 16 and 17, 24 is the vertical shaft of a rotating signal, consisting of two disks or targets, 25 and 26, of any suitable form, and secured rigidly to the shaft 24 at right angles to each other, so as to display the entire surface of one when the edge only of the other is visible, each being painted with a different color, indicating "safety" and "danger" or "safety" and "caution," according to the position and nature of the signal. The lamp on top of the shaft 24 corresponds in color and purpose with the targets, and is for use at night when the target is invisible.

Keyed rigidly to the shaft 24 is a bevel-gear, 27, the teeth of which engage with those of another bevel-gear, 28, keyed rigidly to the shaft 18 of the selector-box, which is extended to receive it, or to a short shaft, 29, forming part of the arm or lever 30, and journaled in the cap 31 of the post. From the outer extremity of the arm 30 the rod 16 of the selector is pivoted. It is evident that if the shaft 24 is rotated in the direction of the arrow, Fig. 17, the arm or lever 30 will swing down on 32 as a center and depress the rod 16, which will actuate the selector in the same manner, as described, by movement of the semaphore-signal. It is obvious that what has been said in relation to the controlling or operation of the semaphore-signal in connection with the selector is also applicable to this form.

I do not intend to limit the broad claims of this patent to any specific form of secondary or route signals, or to any specific form of the primary signal. Different forms may be employed to suit the conditions of the particular use to which they are applied. Other modifications may be made in the apparatus.

My improved electrical selector may be applied to the signaling system shown in Fig. 12, in which case the rods 14 would be connected with the semaphore-arms, and the rod 16 would be actuated directly from a lever, pneumatic cylinder, or other power-connection.

The advantages of my invention will be appreciated by those skilled in the art. The mechanism of the selector is strong, compact, and not liable to get out of order. Controlling it by the electro-magnets is advantageous, because of the greater certainty of action which it insures and the facility which it affords for making the system automatic. The actuating of the secondary signals directly from the primary signals is a material feature of advantage in the apparatus, because it prevents the display of any of the secondary signals unless the primary signal is also moved to "safety." This makes the system safer and in all respects better than if the primary and secondary signals were independently operated.

In the following claims I use the word "actuating-rod" to designate the common power-connection of the several signals, as shown by me in the drawings.

Any other mechanical devices—such as links, levers, and the like—may be used instead of the rod as equivalents thereof.

I claim—

1. In a signaling system wherein there are a primary signal and two or more secondary signals referring thereto, the combination of the primary signal and two or more secondary signals which are normally disconnected from the primary signal, and each of which is provided with a lock for connecting it with the primary signal, whereby motion of the primary signal will mechanically actuate that one of the secondary signals which is connected therewith, substantially as and for the purposes described.

2. In a signaling apparatus, the combination of two or more signals, an actuating-rod provided with locks which adapt it to be connected with each of said signals, electro-magnets controlling said locks, and electric circuits wherein the magnets are included, substantially as and for the purposes described.

3. In a signaling apparatus, the combination, with two or more signals, of a shaft, 18, a system of levers connecting said shaft with each of said signals, and electro-magnets which engage said systems of levers and bring them into operative connection with said shaft 18, substantially as and for the purposes described.

4. In a signaling apparatus, the combination of two or more signals, an actuating-rod common to all said signals and normally disconnected therefrom, electro-magnets having armatures which engage and connect the secondary signals with the said actuating-rod, electric circuits in which the magnets are included, and a primary signal also connected with the actuating-rod, substantially as and for the purposes described.

5. In a signaling system, the combination, with a primary signal and two or more secondary signals, of electrical indicating-circuits and circuit-closers which are actuated by motion of the secondary signals to control said circuits, substantially as and for the purposes described.

6. The combination, with the signal and its actuating-rod, of the electro-magnet and its armature, and interlocking devices—such, for example, as the hooks $f$ and $d$, one of which is moved by the electro-magnet into engagement with the other, and the other of which is movable in a reverse direction to engage the first-named hook and to tend to move the same and to free it from the electro-magnet—substantially as and for the purposes described.

7. In a signaling apparatus, the combination, with a signal and its actuating-rod, which is normally disconnected therefrom, of an electro-magnet having an armature which engages and connects the signal with its actuating-rod, an electrical indicating-circuit, and a circuit-closer operated by movement of the armatures of the magnet to control the indicating-circuit, substantially as and for the purposes described.

8. In a signaling apparatus for railways wherein there are a primary signal and two or more secondary signals, each provided with an electro-magnet which controls it, the combination, with the said electro-magnets and their circuits, of railway-switches, circuit-controlling mechanisms (such as circuit-closers) operated by motion of the railway-switches and controlling the circuits of the magnets of the secondary signals, the circuit of the electro-magnet of the primary signal being connected with each of the circuits of the electro-magnets of the secondary signals, whereby the magnet of the primary signal is operated simultaneously with the operation of the magnets of each of the secondary signals, substantially as and for the purposes described.

9. In a signaling system wherein there are a primary signal and two or more secondary signals which refer to the primary signal, an actuating-rod common to all said secondary signals and normally disconnected therefrom, separate electro-magnets having armatures which engage and connect the secondary signals with the said actuating-rod, and electric circuits in which said magnets are included, said primary signal being also connected with said actuating-rod, whereby motion of the actuating-rod shall actuate the primary signal and one of the secondary signals simultaneously, substantially as and for the purposes described.

In testimony whereof I have hereunto set my hand this 29th day of March, A. D. 1888.

J. PRESSLEY COLEMAN.

Witnesses:
W. B. CORWIN,
J. K. SMITH.